March 29, 1966 W. R. OLSON ETAL 3,243,729

SINE WAVE GENERATOR COMPRISING A RESONANT LOAD ENERGIZED BY A PLURALITY OF RESONANT CHARGE-DISCHARGE STAGES

Filed June 28, 1963

WITNESSES:
Bernard R. Gregory
James F. Young

INVENTORS
Wayne R. Olson and
Wallace J. Hoff.
BY William L. Gates
ATTORNEY

United States Patent Office 3,243,729

Patented Mar. 29, 1966

3,243,729

SINE WAVE GENERATOR COMPRISING A RESONANT LOAD ENERGIZED BY A PLURALITY OF RESONANT CHARGE-DISCHARGE STAGES

Wayne R. Olson and Wallace John Hoff, Catonsville, Md., assignors to Westinghouse Electric Corporation, Pittsburgh, Pa., a corporation of Pennsylvania Filed June 28, 1963, Ser. No. 291,581

7 Claims. (Cl. 331—117)

Figure 1:
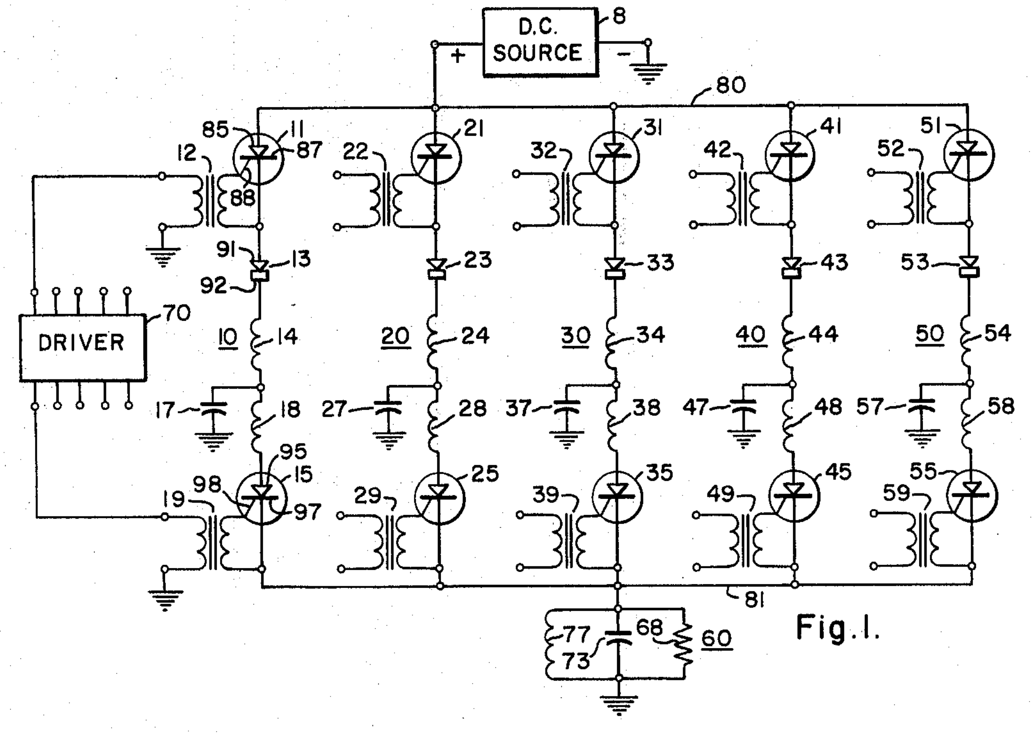

This invention relates to apparatus for generating a high power sine wave signal with solid state devices, and more particularly to a means for utilizing silicon controlled rectifiers as switching elements to generate a relatively high power carrier signal in the very low radio frequency (VLF) and ultrasonic regions of the electromagnetic spectrum.

One type of apparatus for generating VLF sine wave power through the use of silicon controlled rectifiers has been disclosed and claimed in copending application U.S. Serial No. 291,580, filed June 28, 1963, by T. Hamburger et al., which application is assigned to the assignee of the present invention. Said copending application discloses circuitry which charges a pulse forming network through a resonant load such as a tank circuit at a slow rate and then discharges it rapidly into the load causing it to oscillate at its natural frequency whereby an output signal of the type required is generated. The tank circuit in reality is the antenna circuit of the apparatus which radiates the energy to an external medium. The power generating capability of this apparatus is restricted however as only one pulse forming network can be used.

It is an object of the present invention, therefore, to provide an improved means to generate high power sine waves electronically.

It is another object of the present invention to provide an improved means of generating relatively high power low frequency sine waves with solid state devices.

It is a further object of the present invention to provide a power generator in the VLF region for a solid state radio frequency transmitter.

It is still a further object of the present invention to generate high power carrier signals in the VLF and ultrasonic ranges of the electromagnetic spectrum utilizing resonant techniques and solid state devices.

Briefly, the subject invention accomplishes the above cited objects by providing a plurality of substantially identical stages of energy storage components which are separately charged and sequentially discharged into a resonant load such as the antenna output circuit of a radio transmitter. Each stage comprises a storage capacitor and a pair of silicon controlled rectifiers which alternately charge the storage capacitor from a D.C. voltage source and then discharge it into a single resonant load. A first inductance is combined in series with the storage capacitor to form a first resonant circuit. This configuration utilizes the inherent reverse turn off characteristics of the silicon controlled rectifier and the storage capacitor is renonantly charged to a voltage twice that of the source. Additionally another inductance is used in combination with the storage capacitor forming a second resonant circuit which has a frequency of resonance substantially equal to the output frequency of the resonant load for providing the maximum possible efficiency of energy transfer from the capacitor to the resonant load.

Figure 2:
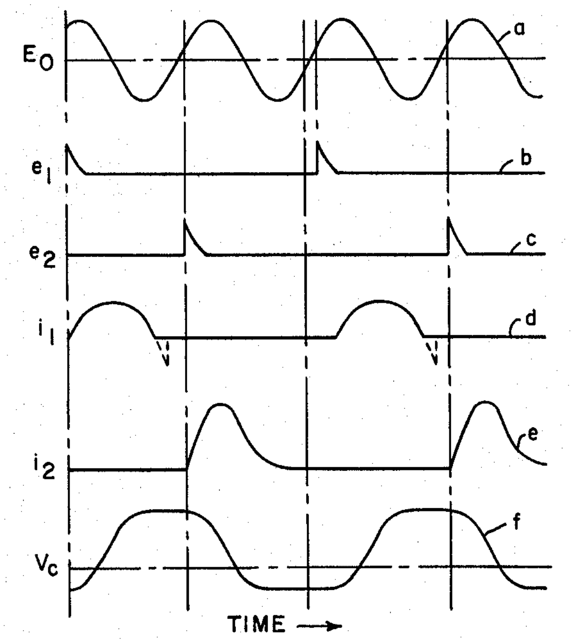

Other objects and advantages of the present invention will become more apparent as the following specification is read in conjunction with the accompanying figures, in which:

FIGURE 1 is a schematic diagram of the preferred embodiment of the subject invention; and FIGURE 2 is a series of waveforms helpful in understanding the operation of the present invention.

Attention is now directed to FIG. 1. A plurality of electrical energy storage stages or sections 10, 20, 30, 40 and 50 are connected in parallel between a source of direct current voltage 8 and a load 60 which comprises an inductance 77, capacitor 73 and a load resistor 68 forming a resonant tank circuit. The load 60 is representative of a resonant load such as might be utilized in a radio transmitter in the antenna system which externally radiates the electromagneitc energy. Accordingly, the resonant load 60 may be, for example, the equivalent circuit of a radio transmitter antenna and its corresponding coupling network which transfers energy from the preceding power output stages to the antenna proper.

Since the plurality of stages 10, 20, 30, 40 and 50 are substantially identical, a detailed description of one stage, for example, stage 10 will suffice for the remainder. Accordingly, stage 10 comprises a pair of semiconductor switch devices 11 and 15, illustrated as silicon controlled rectifiers, which are operatively connected to capacitor 17 to act as switches for alternately charging capacitor 17 and then discharging it into the resonant load 60. More specifically, silicon controlled rectifier 11 includes an anode electrode 85, a cathode electrode 87 and a gate electrode 88. The anode electrode 85 is connected to the positive terminal of the D.C. source 8 over the lead 80. A charging diode 13 is connected to silicon controlled rectifier 11 such that the anode electrode 91 is connected to the cathode electrode 87 of silicon controlled rectifier 11. The cahtode electrode 92 of charging diode 13 is connected to the capacitor 17 through a series inductance 14. The combination of inductance 14 and the capacitor 17 are selectively chosen to exhibit a predetermined resonant frequency which is selected to be substantially equal to or less than the resonant frequency of the resonant load 60 divided by the number of sections or stages utilized. In the embodiment shown six stages are utilized. It should be pointed out, however, that this resonant frequency may be higher, lower or equal to the resonant frequency of the load divided by the number of sections, but it is usually desirable to make it lower in frequency as losses in accumulating a charge in the storage capacitor will be lower. The D.C. source 8, the silicon controlled rectifier 11, the charging diode 13, the inductance 14 and the capacitor 17 form a charging circuit for the capacitor 17 and energy from the D.C. source 8 is transferred to the capacitor 17 when silicon controlled rectifier 11 is rendered conductive.

Associated with silicon controlled rectifier 77 is a transformer 12 which has its secondary winding connected to the gate electrode 88. Controlled rectifier 11 is rendered conductive when a gating signal is applied to the gate electrode 88, which is accomplished by feeding a suitable trigger signal from a driver 70 to the transformer 12.

Connected to capacitor 17 at the junction 93 is a second series inductance 18 which in turn is connected at its other end to silicon controlled rectifier 15. Silicon controlled rectifier 15 comprises an anode electrode 95, a cathode electrode 97 and a gate electrode 98. Another transformer 19 has its secondary winding connected to the gate electrode 98 for supplying a trigger signal to silicon controlled rectifier 15 from the driver 70 for selectively rendering control rectifier 15 conductive.

The cathode electrode 97 of silicon controlled rectifier 15 is connected to one side of the resonant load 60 through the bus line 81. The combination of inductance 18 and capacitor 17 forms a second resonant circuit and the value of inductance 18 is selectively chosen such that the resonant frequency of the second resonant circuit is substantially equal to the output frequency of the tuned resonant load 60 for reasons which will hereinafter become apparent. When silicon controlled rectifier 15 is rendered conductive, the charge accumulated on the capacitor 17 is discharged into the resonant load 60. The combination of the capacitor 17, the inductor 18, the silicon controlled rectifier 15 and the resonant load 60 forms a discharge path for the capacitor 17 since both the capacitor 17 and one side of the resonant load is returned to a point of common reference potential illustrated as ground.

In operation, stage 10 as well as stages 20, 30, 40 and 50 operate as follows. Silicon controlled rectifier 11 is rendered conductive by means of a trigger signal from the driver 70 while silicon controlled rectifier 16 remains non-conductive. Capacitor 17 is charged from the D.C. source 8 and the voltage thereacross will rise to approximately twice the value of the D.C. source voltage whereupon the current flow through the silicon controlled rectifier falls substantially to zero and will begin to reverse direction; however, the silicon controlled rectifier will become non-conductive at this point since it is a unidirectional device capable of current transfer only in the direction noted.

It should be noted that those skilled in the art will appreciate the fact that the silicon controlled rectifier resembles a thyratron electron tube in its operation in that once the device has been triggered into conduction it will remain conducting without control until the current therethrough has been decreased to a minimum sustaining current level at which time the device will become non-conducting and will remain so until it is triggered into conduction at a subsequent time. It will also be appreciated by these skilled in the art that the resonance condition of the combination of capacitor 17 and the inductance 14 forming the first resonant circuit allows the capacitor 17 to rise to twice the magnitude of the source votlage of D.C. source 8.

The action of the charging diode 13 is to effect a faster turn-off upon completion of the resonant charging of the capacitor 17, thus preventing considerable power dissipation in silicon controlled rectifier 13 since a transient reverse current may exist before turn-off is effected, particularly in the high current silicon controlled rectifiers. When the capacitor 17 becomes substantially fully charged and the silicon controlled rectifier 11 becomes non-conductive, silicon controlled rectifier 15 is rendered conductive at a preselected later time by means of a trigger signal from driver 70 and the charge built up on the capacitor 17 is discharged or dumped into the resonant load 60. This transfer of electrical energy causes the load 60 which is a resonant tank circuit to oscillate or ring at its resonant frequency which frequency is selectively chosen to be the output frequency of the apparatus. The resonant frequency of the combination of the capacitor 17 and the inductor 18 as has been noted above that it is chosen to be substantially the same as the natural resonant frequency or the output frequency of the tank circuit 60. The object of having the frequencies substantially the same is to provide for maximum efficiency of energy transfer from the capacitor 17 to the resonant load 60.

Additionally, it is required that the trigger signal generated by the driver 70 be synchronized with the resonant oscillation present in the tank circuit 60. Thus the discharge of capacitor 17, which takes place when silicon controlled rectifier 15 is rendered conductive, always occurs during the same period of a tank circuit oscillation. The period is chosen such that energy transfer is effected over a rather large portion of the cycle. This is possible because the natural resonant frequency of the capacitor 17 and inductor 18 is chosen to be the same as that of the tank circuit 60. The presence of this resonant discharge also results in an energy transfer to the load 60 until the current reverses. An additional result of the presence of the resonant discharge is that silicon conrolled rectifier 15 is slowly rendered non-conductive as it proceeds through its negative peak potential and then proceeds in the positive direction. Thus the silicon controlled rectifier 15 is "eased off" as the current flowing therethrough approaches the minimum sustaining current level, thereby avoiding the interruption of a substantially large current which could produce voltage transients of a magnitude which could prove detrimental to the device. Large switching transients on the silicon controlled rectifier 15 could possibly result in complete destruction of the device. By easing the silicon controlled rectifier 15 off, maximum efficiency is obtained and the life of the silicon controlled rectifier is enhanced due to the fact that switching transients are prevented from occurring.

In summation, therefore, the action of an individual stage, for example stage 10, is that, silicon controller rectifier 11 is first rendered conductive to charge the capacitor 17 and then at some later time silicon controlled rectifier 15 is rendered conductive to discharge capacitor 17 into the resonant load 60. Furthermore, the action of the triggering of the respective silicon controlled rectifiers is such that at no time are both silicon controlled rectifiers rendered conductive simultaneously.

Reference to FIG. 2 will more fully explain the operation of an individual stage, for example stage 10. With the exception of curve *a* which is a sine wave of voltage $E_0$ which appears across the resonant load 60, FIG. 2 is a diagram illustrating the various waveforms occurring in a single section. Curve *b* is illustrative of a trigger pulse $e_1$ applied to the silicon controlled rectifier 11 for charging the capacitor 17. Curve *c* is illustrative of a trigger pulse $e_2$ applied to silicon controlled rectifier 15 for discharging capacitor 17. Curve *d* is illustrative of the current flow $i_1$ in the charge path for charging the capacitor 17. Curve *e* is a diagram illustrative of the current flow $i_2$ in the discharge circuit wherein the charge accumulated by the capacitor 17 is dumped into the resonant load 60. It should be noted that the trailing edge of the current waveform shown in curve *e* is relatively slow decaying with respect to the leading edge thereof. This is due to the fact that the silicon rectifier is eased off as previously explained. Finally, curve *f* is illustrative of the voltage waveform of the voltage which appears across the capacitor 17 during both the charge and discharge time intervals.

The plurality of stages employed depends upon the requirements of one practicing the subject invention. The utilization of the plurality of sections is such that each section is adapted to accumulate a predetermined charge on the respective capacitor element and then selectively deliver energy to the resonant load 60 such that the oscillations built up therein are sustained and provide a relatively high power output voltage. Each of the stages illustrated as stages 10–50, are driven by a driver means 70 such that the stages operate in a sequential manner for delivering energy to the resonant load 60. In addition, the trigger-signals used for the sequential triggering of the silicon controlled rectifiers in the discharge portions of each of the stages must in all cases be synchronized with the output oscillation of the tank circuit 60. For example, the plurality of stages 10 to 50 may be discharged in "Gatling gun" fashion to generate a large power output in the resonant load 60. The "Gatling gun" sequential operation of the various stages is the subject of a copending application, Serial No. 291,571, filed June 28, 1963, by G. R. Brainerd et al. and which is assigned to the assignee of the present invention. The use of the plurality of sections operated as such permits high power to be obtained since each single section has specific power limitations as determined by the power handling capabilities of the silicon controlled rectifiers themselves. However, the use of the plurality of stages thus permits a large quantity of power to be generated with relatively lower power devices. Also, an improved efficiency arises as the charging of the storage capacitors can be done more efficiently at a slow rate as previously described. Also as described previously, the discharging of the capacitors can be done very efficiently with proper adjustment of loading so as to minimize reverse current transients.

Although the present invention has been described with a certain degree of particularity, it should be understood that the present disclosure has been made only by way of example and that numerous changes in the details of the circuitry and the combination and arrangement of elements may be restorted to without departing from the scope and spirit of the present invention.

We claim as our invention:

1. In a solid state power generator operated from a source of direct current voltage and utilizing the "Gatling gun" approach wherein a large amount of sine wave power is generated through the sequential operation of a plurality of relatively smaller power handling stages the combination of: a resonant tank circuit; a plurality of substantially identical circuit sections, each comprising a charging and a discharging circuit, said charging circuit comprising a semiconductor switch device, an inductance, and a capacitance coupled in series combination to said source; and said discharging circuit comprising another semiconductor switch, another inductance, and said capacitance connected in series combination to said resonant tank circuit; and means for sequentially controlling the conductivity of said switch devices to produce said large amount of power in said resonant tank circuit.

2. A sine wave source for very low frequencies utilizing solid state devices, the combination comprising: a source of D.C. voltage; a resonant output circuit having a predetermined resonant frequency; and a plurality of substantially identical stages, each comprising a resonant circuit of a first type and a resonant circuit of a second type, said resonant circuit of said first type comprising a silicon controlled rectifier, an inductance and a capacitance connected in series across said source of D.C. voltage, and said resonant circuit of said second type comprising another silicon controlled rectifier, another inductance and said capacitance connected in series combination across said resonant output circuit; and means for selectively rendering said silicon controlled rectifier and said another silicon controlled rectifier of each stage conductive.

3. A high power sine wave generator for a VLF transmitter comprising in combination: a direct current source; a resonant load circuit having a predetermined resonant output frequency; a plurality of substantially identical energy storage sections connected in parallel between said source and said resonant load, each of said sections comprising a first and a second semiconductor switching device, a first and a second inductor and a capacitor, said first semiconductor switching device being operably coupled to said first inductor and said capacitor to selectively supply current from said source to said capacitor through said first inductor, said first inductor and said capacitor further coupled together to provide a first resonant circuit having a preselected resonant frequency, said second semiconductor switching device being operably coupled between said capacitor and said resonant load circuit to selectively supply current to said load from said capacitor through said second inductor, said capacitor and said second inductor further coupled together to provide a second resonant circuit having a resonant frequency substantially equal to said predetermined output frequency; and means for selectively rendering each semiconductor switching device conductive.

4. An RF generator for VLF frequencies utilizing solid state devices, the combination comprising: a direct current source; a resonant tank circuit forming a load having a predetermined output frequency; a plurality of substantially identical circuit stages connected in parallel between said source and said resonant load, each of said stages comprising a first silicon controlled rectifier, a first inductor and a capacitor connected in series circuit relationship across said source, said first silicon controlled rectifier being operable to selectively supply current from said source to said capacitor through said first inductor, said first inductor and said capacitor further defining a first resonant circuit having a resonant frequency preferably less than the predetermined output frequency divided by the number of said plurality of circuit stages, and a second silicon controlled rectifier, a second inductor and said capacitor being series connected across said resonant load tank circuit, said second silicon controlled rectifier being operable to selectively supply current to said load from said capacitor, said second inductor and said capacitor defining a second resonant circuit having a resonant frequency substantially equal to said output frequency.

5. A high power sine wave generator for a VLF solid state transmitter comprising in combination: a source of D.C. potential, a first silicon controlled rectifier; means for selectively rendering said silicon controlled rectifier conductive; a first series resonant circuit comprising a first inductance and a capacitor; a charging diode being coupled between said silicon controlled rectifier and said first series resonant circuit to provide a series charging circuit for said capacitor from said source when said first rectifier is rendered conductive; a second series resonant circuit comprising a second inductance and said capacitor; a second silicon controlled rectifier; means for selectively rendering said second rectifier conductive; and a tuned output circuit having a predetermined resonant frequency; said second silicon controlled rectifier and said second resonant circuit being series connected substantially across said tuned output circuit for transferring electrical energy from said capacitor to said load circuit when said second silicon controlled rectifier is rendered conductive.

6. In a solid state transmitter utilizing sequentially operated energy storage stages to develop a high power sine wave for radiation by an antenna load and being driven by a source of D.C. potential; a plurality of substantially identical stages each comprising a first series resonant circuit including an inductance and a capacitor having a predetermined resonant frequency, charging diode means connected to said series resonant circuit, and first silicon controlled rectifier means connected at one end to said diode means and at the other end to said source for transferring electrical energy from said source to said capacitor through said charging diode means when said first rectifier means is rendered conductive, a second series resonant circuit including an inductance and said capacitor of the first resonant circuit, second silicon controlled rectifier means coupling said second resonant circuit to said load for transferring electrical energy from said capacitor to said load when said second silicon controlled rectifier means is rendered conductive; and means for selectively rendering the first rectifier means and the second rectifier means of each stage conductive in a predetermined sequence.

7. In a solid state transmitter operating in the VLF range of the radio frequency spectrum and utilizing sequential transfer of electrical energy to a resonant tank circuit to generate an output carrier signal, a plurality of substantially identical stages connected in parallel between a source of D.C. potential and said resonant tank circuit, each of said plurality of stages including a charge circuit and a discharge circuit, said charge circuit comprising a silicon controlled rectifier having an anode, a cathode and a gate electrode, circuit means for connecting the anode electrode to said source, a first inductance, circuit means for coupling said cathode electrode to said first inductance, a capacitor connected to the other side of said inductance for completing a series circuit, said first silicon controlled rectifier having means connected to said gate electrode for rendering said silicon controlled rectifier selectively conductive, said discharge circuit comprising a second silicon controlled rectifier having an anode electrode, a cathode electrode and a gate electrode, a second inductance, circuit means for connecting said second inductance to said anode electrode, means for coupling the other side of said second inductance to said capacitor of said charging circuit, means for coupling the cathode electrode of said second silicon controlled rectifier to said resonant tank circuit, and means connected to said gate electrode of said second silicon controlled rectifier for selectively rendering it conductive, whereby said first and said second silicon controlled rectifier are rendered alternately conducting for first charging said capacitor from said potential source and then discharging through said second silicon controlled rectifier delivering a predetermined amount of electrical energy to said tank circuit for rendering it oscillating at its predetermined resonant frequency to generate said output carrier signal.

References Cited by the Examiner

UNITED STATES PATENTS

| | | | |
|---|---|---|---|
| 2,721,265 | 10/1955 | Rothman et al. | 331—166 |
| 3,147,419 | 9/1964 | Cope | 307—88.5 |

ROY LAKE, *Primary Examiner.*

S. H. GRIMM, *Assistant Examiner.*